(12) United States Patent
Krüger

(10) Patent No.: US 10,974,974 B2
(45) Date of Patent: Apr. 13, 2021

(54) QUARTZ SLEEVE SUPPORT FOR A UV-LAMP

(71) Applicant: Xylem IP Management S.à r.l., Senningerberg (LU)

(72) Inventor: Friedhelm Krüger, Lemgo (DE)

(73) Assignee: Xylem IP Management S.à r.l., Senningerberg (LU)

( * ) Notice: Subject to any disclaimer, the term of this patent is extended or adjusted under 35 U.S.C. 154(b) by 308 days.

(21) Appl. No.: 16/309,193

(22) PCT Filed: Jun. 27, 2017

(86) PCT No.: PCT/EP2017/065865
§ 371 (c)(1),
(2) Date: Dec. 12, 2018

(87) PCT Pub. No.: WO2018/002056
PCT Pub. Date: Jan. 4, 2018

(65) Prior Publication Data
US 2020/0156962 A1 May 21, 2020

(30) Foreign Application Priority Data
Jun. 27, 2016 (EP) .................................. 16176426

(51) Int. Cl.
*C02F 1/32* (2006.01)
(52) U.S. Cl.
CPC ............... *C02F 1/325* (2013.01); *C02F 1/32* (2013.01); *C02F 2201/328* (2013.01);
(Continued)
(58) Field of Classification Search
CPC .... C02F 1/325; C02F 1/32; C02F 2201/3223; C02F 2201/328; C02F 2201/3225; C02F 2301/024; C02F 2303/04
(Continued)

(56) References Cited

U.S. PATENT DOCUMENTS

| 4,767,932 A | 8/1988 | Ellner |
| 2011/0127207 A1* | 6/2011 | Stenman ................. C02F 1/325 210/251 |

(Continued)

FOREIGN PATENT DOCUMENTS

| CA | 2857147 A1 | 6/2013 |
| CN | 202924791 U | 5/2013 |

(Continued)

OTHER PUBLICATIONS

International Preliminary Report on Patentability for Application No. PCT/EP2017/065865, dated Jan. 1, 2019—9 pages.

(Continued)

*Primary Examiner* — Kiet T Nguyen
(74) *Attorney, Agent, or Firm* — RatnerPrestia

(57) ABSTRACT

An apparatus for the treatment of water includes an elongated housing having a first end and a second end. The first end has a water inlet and the second end has a water outlet. An elongated ultraviolet radiation source with a sleeve is concentrically located within the elongated housing. The elongated ultraviolet radiation source has, at its first end, electrical connections, which extend through the second end of the housing and have a second free end held in a support element. The support element includes a supporting structure containing a ring element and from thereon radially inwardly running arms. The arms are designed in such a way that during assembly the arms are resiliently deformed and wherein, if assembled, the arms are pressed against the sleeve, so that the free end of the ultraviolet radiation source is held by the arms in a resilient manner.

15 Claims, 4 Drawing Sheets

(52) U.S. Cl.
CPC .............. *C02F 2201/3223* (2013.01); *C02F 2201/3225* (2013.01); *C02F 2301/024* (2013.01); *C02F 2303/04* (2013.01)

(58) Field of Classification Search
USPC ........................................ 250/436, 455.11
See application file for complete search history.

(56) References Cited

U.S. PATENT DOCUMENTS

| | | |
|---|---|---|
| 2012/0051977 A1 | 3/2012 | Boodaghians et al. |
| 2013/0088138 A1 | 4/2013 | Sasai et al. |
| 2014/0144789 A1* | 5/2014 | Barry .................. C02F 1/46109 205/742 |
| 2016/0214076 A1* | 7/2016 | Kiremitci .................. A61L 9/20 |

FOREIGN PATENT DOCUMENTS

| | | |
|---|---|---|
| EP | 2772929 A1 | 9/2014 |
| WO | 2012052869 A1 | 4/2012 |
| WO | 2013034326 A1 | 3/2013 |

OTHER PUBLICATIONS

International Search Report and Written Opinion for Application No. PCT/EP2017/065865, dated Aug. 7, 2017—13 pages.

* cited by examiner

QUARTZ SLEEVE SUPPORT FOR A UV-LAMP

CROSS-REFERENCE TO RELATED APPLICATIONS

This patent application is a U.S. National Phase Patent Application of PCT Application No.: PCT/EP2017/065865, filed Jun. 27, 2017, which claims priority to European Patent Application No. 16176426.1, filed Jun. 27, 2016, each of which is incorporated by reference herein in its entirety.

FIELD OF THE INVENTION

The present invention relates to an apparatus for the treatment of water.

BACKGROUND OF THE INVENTION

Ultraviolet radiation for the treatment of water utilizes an elongated radiation source in the form of an elongated ultraviolet lamp located within a quartz sleeve. In domestic water treatment units, the lamp and sleeve are typically located within a tube or housing through which the water to be treated is passed.

The sleeve needs to be supported within a closed vessel system to avoid mechanical breakage. Typically, single ended sleeves are supported on the inlet section of these mentioned vessels. In particular (but not only) single lamp reactor systems benefit from any turbulent flow to increase retention time.

It is known the use of diffuser plates to impart turbulence and rotational flow of water within the vessel, to improve the uniformity and predictability of the treatment of the water. Further known are the use of a fin to impart turbulence to water as it flows into the annular chamber of a water treatment unit and water treatment devices having an inlet baffle plate with orifices.

CA 2 875 147 A1 discloses a photoelectric catalytic oxidation system with a container housing a counterelectrode and a photoelectrode arranged around a UV light source, wherein the photoelectrode is irradiated with UV light for photocurrent and/or chlorine generation. A spacer element is disposed between a sleeve tube and a housing. The spacer has two concentric rings connected with radial bridges. The spacer is not designed to resiliently support the free end of the sleeve tube.

US 2012/0051977 A1 discloses a point of use water treatment system, wherein the free end of the UV lamp is support by radial fins which are secured to the sides of cap portion of the housing. The fins connect an inner ring with the cap portion, wherein the connection is stiff in radial direction. The free end of the UV lamp is positioned in the inner ring structure or in a spring connected to the inner ring structure. The UV lamp is not resiliently supported by deformable arms.

U.S. Pat. No. 4,767,932 A, which is considered the closest prior art document, discloses a UV purification system with a resilient spacer arranged between a UV lamp and a quartz sleeve. The resilient spacer is provided to minimize stress of vibration and to resiliently maintain the respective lamp in special relationship within the respective quartz jacket. The resilient spacer comprises a resilient split ring or collar which is adapted to be snap fitted about the lamp. Projecting laterally and circumferentially spaced about the circumference of the collar are a plurality of resilient or spring fingers which are directed outwardly. Since the split ring on the inside of the spacer and is mounted directly to the lamp or to the sleeve tube, this ring covers a relatively large portion of the surface, thereby shadowing the water from part of the UV light.

SUMMARY OF THE INVENTION

It is an objective of the present invention to provide an apparatus for treatment of water with a quartz sleeve support, which is cheap, less complex and allows easy installation, and which covers only a small portion of the UV light emitting surface of the sleeve tube.

This problem is solved by an apparatus with the features listed in claim 1. Accordingly, an apparatus for the treatment of water is provided, said apparatus comprising:

- an elongated housing having a first housing end and a second housing end, said first housing end having a first water conduit and said second housing end having a second water conduit;
- an elongated ultraviolet radiation source with a sleeve located within the elongated housing, said elongated ultraviolet radiation source having a first end with electrical connections, and having a second free end; and
- a support element supporting the second free end,
- wherein the support element comprises a supporting structure containing a ring element and from thereon radially inwardly extending and resiliently deformable arms,
- wherein the deformable arms have a first end which is fixed to the ring element and a tip portion, and
- wherein the second free end is resiliently held by the tip portions of the arms.

Additional quartz sleeves surrounding the UV lamp are not mandatory. Therefore, the word "sleeve" should be understood in such a way that when no additional quartz sleeve is present, the glass of the UV lamp (lamp body) itself is the sleeve. The glass of the lamp is likewise made of quartz material.

The word "held" should be understood so that the arms are pressed against the conical part or the tapered end portion of the free end. This quartz sleeve support has a very simple but effective design. It is advantageous, if the arms are only pressed against the tapered end portion of the free end, so that the sleeve is retained in its longitudinal position.

The tip portions of the arms touch the sleeve tube only in very small surface areas, thus minimizing the shadowing effect.

Preferably the arms are designed in such a way that during assembly the arms are resiliently deformed and wherein if assembled the arms are pressed against the sleeve, so that the free end of the ultraviolet radiation source is held by the arms in a resilient manner.

Preferably, the diameter of the sleeve is between 40% and 60% of the diameter of the ring element. Advantageously, the arms are arranged equally spaced in peripheral direction of the ring element. For simplicity and uniform distribution of force, it is preferred that the arms are oblong and equally shaped. In addition it is favourable, that in a relaxed state of the arms the inner ends thereof form a substantially circular opening with a diameter less than the diameter of the sleeve. To the best advantage, the supporting structure has at least six arms.

In a preferred embodiment the supporting structure has spacers extending radially outward of the ring element. Advantageously, the spacers are arranged equally spaced in peripheral direction of the ring element and the free circumferential surface of the ring element predominates.

In another favourable embodiment the support element comprises flaps arranged on arms, which extend radially outward of the ring element.

In running state the flaps are preferably angulated, so the flaps do not radially project over the supporting structure. Advantageously, the flaps are arranged at the arms at about half their length. Preferably, the arms are essentially rectangular with an oblong shape. It is beneficial, if the support element has at least four flaps, each arranged on one arm, wherein the arms are equally distributed along the circumference. To the best advantage the support element is a one-piece stamped-bent part.

The ultraviolet radiation source, the sleeve and the support element are preferably arranged concentrically.

BRIEF DESCRIPTION OF THE DRAWING FIGURES

Preferred embodiments of the present invention will be described with reference to the drawings. In all figures the same reference signs denote the same components or functionally similar components.

DETAILED DESCRIPTION OF THE INVENTION

Figure 1:
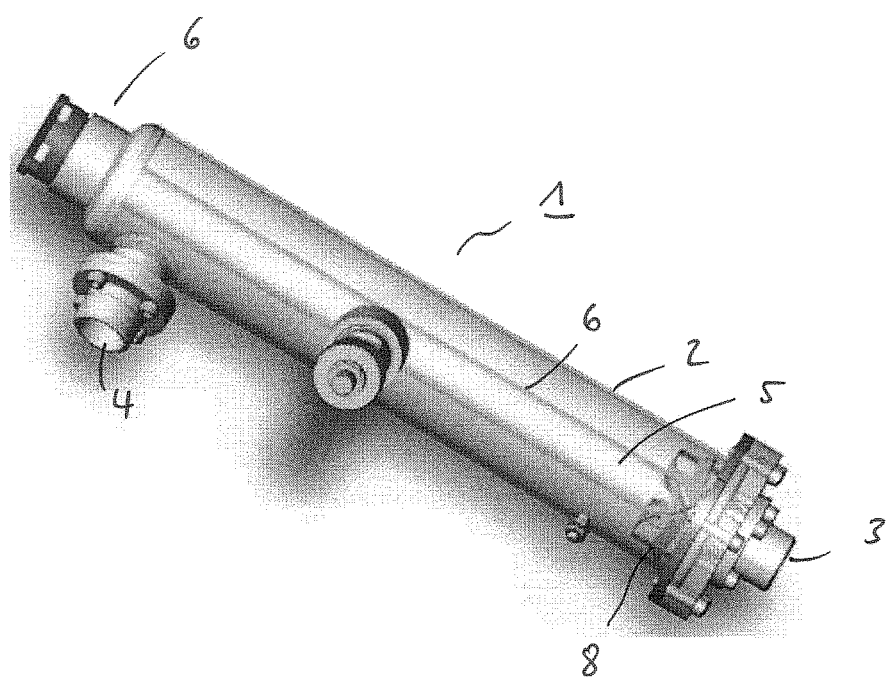
FIG. 1 shows a UV reactor with an inventive quartz sleeve support.
Figure 2:
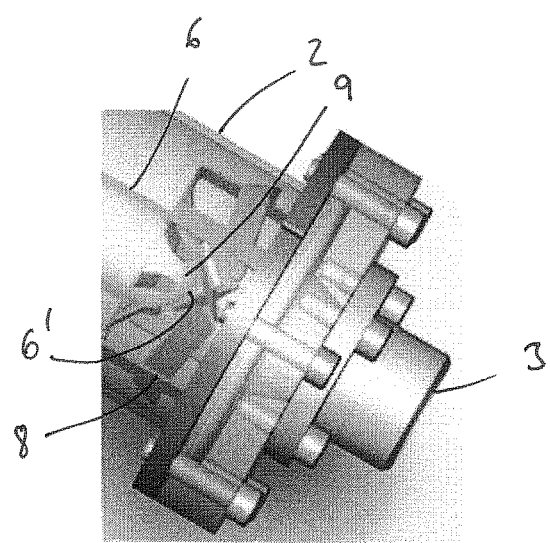
FIG. 2 shows a close-up of the inventive quartz sleeve support of FIG. 1.

Referring to FIG. 1 and FIG. 2, the UV reactor 1 consists of a cylindrical housing 2 with inlet 3 for water to be purified and an outlet 4 for the treated water. A UV lamp 5 with a lamp body extending into a quartz sleeve 6 is arranged centred in the UV reactor 1. On the outlet side the UV lamp 5 is support by a bushing 7 and is provided with electrical connections. On the inlet side the UV lamp 5 is supported by a support element 8. The support element 8 is provided with a circular opening 9 through which the quartz sleeve 6 passes.

Figure 3:
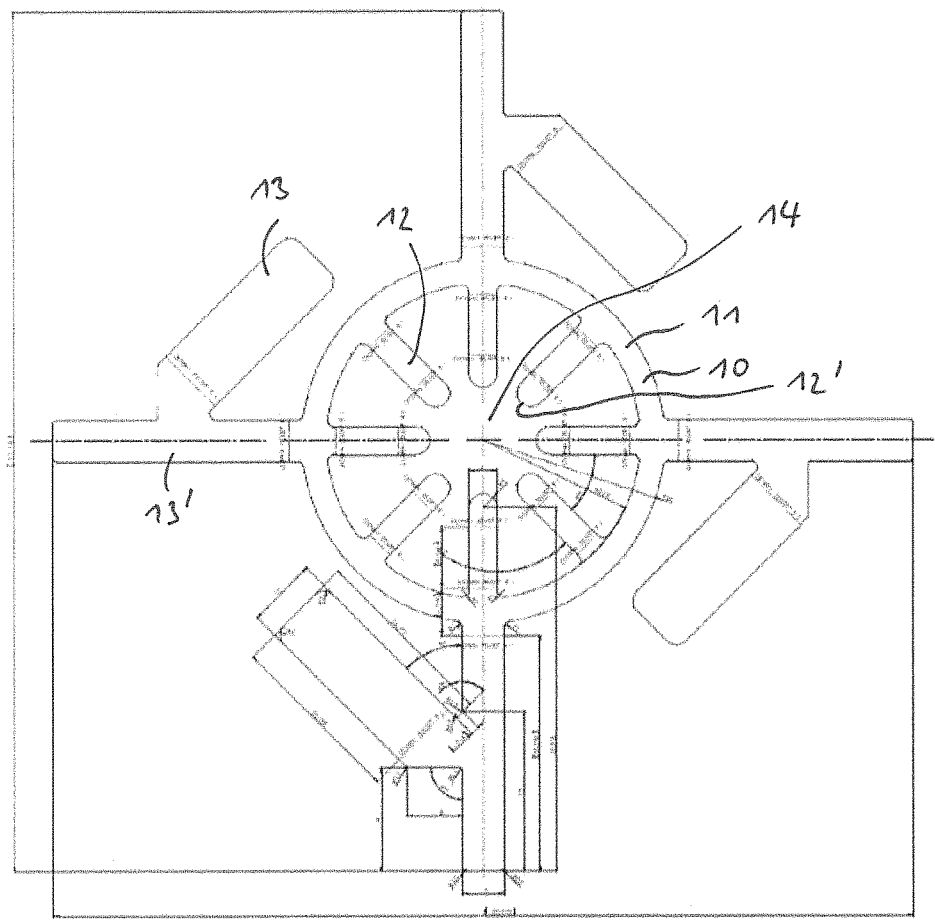
FIG. 3 shows in longitudinal section and spatial representation the inventive quartz sleeve support of FIGS. 1 and 2.
Figure 3:
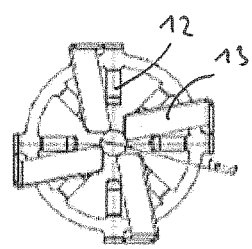
Figure 3:
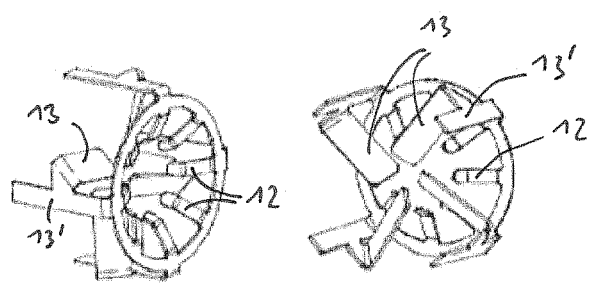

As shown in FIG. 3, the support element 8 has two functional elements: a supporting structure 10 containing a ring element 11 and from thereon radially inward running arms 12, wherein the arms 12 are spaced equally in peripheral direction and to disturb laminar flow of the water four or more flaps 13 on the inlet side.

The arms 12 are essentially rectangular and have an oblong shape. The inner ends 12' of the arms 12 form a substantially circular opening 14. The diameter of the circular opening 14 is less than the diameter of the quartz sleeve 6 and the quartz sleeve 6 can be inserted into the opening 14 by bending the arms 12. The arms 12 can also be pre-angulated according to the quartz sleeve 6 diameter. The supporting structure 10 is resilient and absorbs movement e.g. vibrations of the UV lamp. The arms 12 can press against the quartz sleeve 6 at the tapered end portion of the free end, so that the ultraviolet radiation source 5, 6 is held in place by the arms in longitudinal direction. However it is also possible, that the arms 12 press against the free end of the quartz sleeve 6 at the cylindrical part thereof, so that the ultraviolet radiation source 5, 6 is held by the arms in a resilient manner, while moveable in longitudinal direction.

The flaps 13 are arranged on arms 13', which extend radially outward of the supporting structure 10, e.g. the ring element 11, and are arranged equally spaced in peripheral direction. In case of the shown embodiment, each arm 13' holds a single flap 13. The arms 13' are essentially rectangular and have an oblong shape oriented in radial direction. In running state the arms 13' are angulated away from the distal free end 6' of the quartz sleeve 6, in reverse direction of water flow. In this state, the arms 13' form spacers, which slightly extend radially outward of the ring element 11. The flaps 13 are as well essentially rectangular and have an oblong shape. Their width is about twice as wide as the width of the arms 13'. The flaps 13 are arranged at the arms 13' at about half their length. The length of the arms 13' is roughly the same as the length of the flaps 13. The flaps 13 are preferably bent inward so that the flaps 13 do not project over the ring element 11 and/or the spacers. The flaps 13 are arranged perpendicular to the water flow, increasing the disruption of flow. The consequence is that the flow of water is turbulent and more effective treatment of microorganisms in the water may be achieved.

The invention is not limited to a specific amount of flaps 13. The design of the flaps 13 and their arms 13' as well as their orientation, e.g. angle, can vary.

Figure 4:
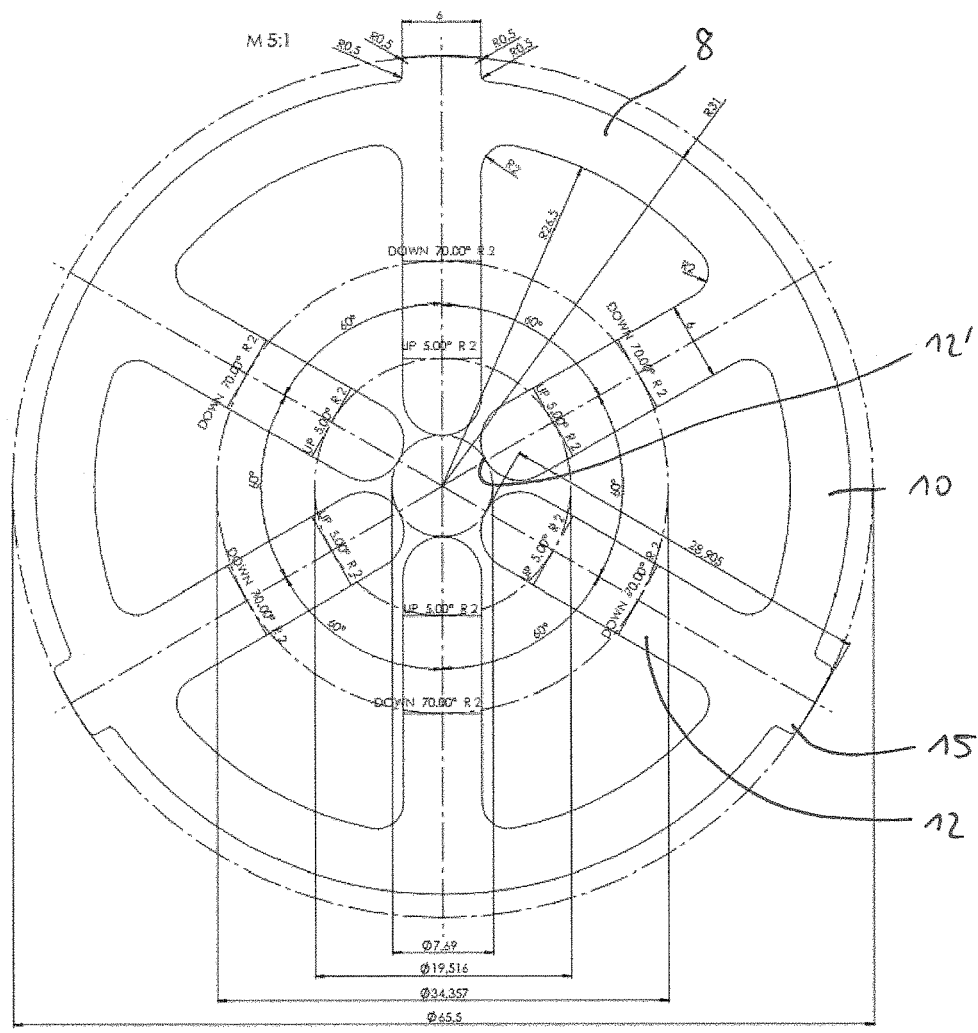
FIG. 4 shows a second embodiment of the present invention in longitudinal section and spatial representation.
Figure 4:
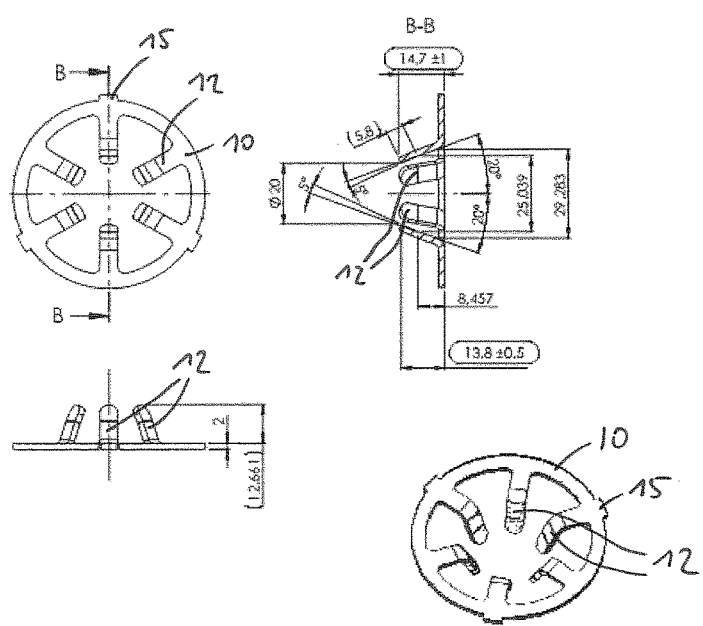

FIG. 4 shows a second embodiment of the present invention. The support element 8 has the supporting structure 10 and instead of flaps arranged on arms, spacers 15 extending radially outward. The inward orientated arms 12 themselves disrupt the flow of water from the inlet to the outlet side.

Preferably, the support element 8 is one piece, made out of steel sheets as a stamped-bent part.

In another preferred embodiment with no additional quartz sleeve being present, the inventive quartz sleeve support holds the quartz glass of the lamp directly. In this case the glass of the lamp is referred to as sleeve.

The inventive quartz sleeve support is simple, easy to fabricate and thus cheap, and allows easy installation without any risk of breaking the sleeve.

The invention claimed is:

1. An apparatus for the treatment of water, said apparatus comprising:
    an elongated housing having a first housing end and a second housing end, said first housing end having a first water conduit and said second housing end having a second water conduit;
    an elongated ultraviolet radiation source with a sleeve located within the elongated housing, said elongated ultraviolet radiation source having a first end with electrical connections and a second free end; and
    a support element that supports the second free end,
    wherein the support element comprises a supporting structure containing a ring element and resiliently deformable arms extending radially inwardly from the ring element, wherein each of the deformable arms has a first end which is fixed to the ring element and a tip portion, and wherein the second free end of the elongated ultraviolet radiation source is resiliently held by the tip portions of the arms.

2. The apparatus according to claim 1, wherein a diameter of the sleeve is between 40% and 60% of a diameter of the ring element.

3. The apparatus according to claim 1, wherein the arms are equally spaced in a peripheral direction of the ring element.

4. The apparatus according to claim 1, wherein the arms are oblong and equally shaped.

5. The apparatus according to claim 1, wherein, in a relaxed state of the arms, inner ends of the arms form a substantially circular opening with a diameter less than a diameter of the sleeve.

6. The apparatus according to claim 1, wherein the supporting structure has at least six arms.

7. The apparatus according to claim 1, wherein the supporting structure has spacers extending radially outward of the ring element.

8. The apparatus according to claim 7, wherein the spacers are equally spaced in a peripheral direction of the ring element and a free circumferential surface of the ring element predominates.

9. The apparatus according to claim 1, wherein the support element comprises flaps arranged on a second set of arms that extend radially outward of the ring element.

10. The apparatus according to claim 9, wherein the flaps are angulated so that the flaps do not radially project over the supporting structure.

11. The apparatus according to claim 9, wherein each flap extends from one of the arms of the second set of arms at a location that is about half of a length of said one of the arms of the second set of arms.

12. The apparatus according to claim 9, wherein each arm of the second set of arms is substantially rectangular with an oblong shape.

13. The apparatus according to claim 9, wherein the support element has at least four of said flaps, each flap being arranged on one arm of the second set of arms, wherein the second set of arms are equally distributed along a circumference of the ring element.

14. The apparatus according to claim 1, wherein the support element is a one-piece stamped and bent part.

15. The apparatus according to claim 1, wherein the sleeve constitutes glass of an ultraviolet lamp or an additional sleeve tube surrounding the radiation source.

\* \* \* \* \*